(12) United States Patent
Song et al.

(10) Patent No.: US 9,919,583 B2
(45) Date of Patent: Mar. 20, 2018

(54) AUTOMOTIVE SHEET HEATER USING RADIANT HEAT

(71) Applicants: LG Hausys, Ltd., Seoul (KR); LG CHEM, LTD., Seoul (KR)

(72) Inventors: Yea Ri Song, Seoul (KR); Seong Hoon Yue, Seongnam-si (KR); Jong Hun Lee, Seongnam-si (KR); Chang Hak Shin, Seoul (KR); Ku Il Park, Yongin-si (KR); Deok Ryul Hwang, Seoul (KR); Hwan Seok Park, Anyang-si (KR)

(73) Assignees: LG HAUSYS, LTD., Seoul (KR); LG CHEM, LTD., Seoul (KR)

( * ) Notice: Subject to any disclaimer, the term of this patent is extended or adjusted under 35 U.S.C. 154(b) by 205 days.

(21) Appl. No.: 14/768,451

(22) PCT Filed: Feb. 24, 2014

(86) PCT No.: PCT/KR2014/001459
§ 371 (c)(1),
(2) Date: Aug. 17, 2015

(87) PCT Pub. No.: WO2014/129857
PCT Pub. Date: Aug. 28, 2014

(65) Prior Publication Data
US 2016/0001632 A1 Jan. 7, 2016

(30) Foreign Application Priority Data
Feb. 22, 2013 (KR) ........................ 10-2013-0019048

(51) Int. Cl.
*B60H 1/22* (2006.01)
*H05B 3/14* (2006.01)
(Continued)

(52) U.S. Cl.
CPC ......... *B60H 1/2225* (2013.01); *H05B 3/0014* (2013.01); *H05B 3/14* (2013.01);
(Continued)

(58) Field of Classification Search
CPC   H05B 3/20; H05B 2203/02; H05B 2203/032; H05B 2214/04; H05B 3/22;
(Continued)

(56) References Cited

U.S. PATENT DOCUMENTS 4,335,298 A * 6/1982 Newbold, Jr. ........ B29C 70/885
219/436
5,138,133 A * 8/1992 Sakurada ................. H05B 3/36
219/211

(Continued)

FOREIGN PATENT DOCUMENTS

CN        102056353 A        5/2011
CN        102300346 A        12/2011
(Continued)

OTHER PUBLICATIONS

Chinese Office Action dated May 19, 2016 in connection with the counterpart Chinese Patent Application No. 201480009204.X.
(Continued)

*Primary Examiner* — David Angwin
*Assistant Examiner* — Amit K Singh
(74) *Attorney, Agent, or Firm* — Hauptman Ham, LLP

(57) ABSTRACT

Described herein is an automotive sheet heater. The automotive sheet heater includes a stacked structure of a far-infrared radiating layer, a metal layer, and a metal wire-containing carbon nanotube heating layer. The carbon nanotube heating layer includes 1 wt % to 50 wt % of metal wires.

14 Claims, 9 Drawing Sheets

(51) Int. Cl.
  *H05B 3/22* (2006.01)
  *H05B 3/00* (2006.01)
  *H05B 3/20* (2006.01)

(52) U.S. Cl.
  CPC .............. *H05B 3/148* (2013.01); *H05B 3/20* (2013.01); *H05B 3/22* (2013.01); *B60H 2001/2293* (2013.01); *H05B 2203/02* (2013.01); *H05B 2203/032* (2013.01); *H05B 2214/04* (2013.01)

(58) Field of Classification Search
  CPC ........ H05B 3/0014; H05B 3/14; H05B 3/148; B60H 2001/2293; B60H 1/2225
  USPC ......................................................... 219/202
  See application file for complete search history.

(56) References Cited

U.S. PATENT DOCUMENTS

| | | | | |
|---|---|---|---|---|
| 5,356,724 | A * | 10/1994 | Tsuda | C23C 8/10 428/472.2 |
| 6,004,588 | A * | 12/1999 | Torii | A61K 41/0004 424/600 |
| 8,664,573 | B2 * | 3/2014 | Shah | B64D 15/12 219/482 |
| 2011/0081139 | A1 * | 4/2011 | Lee | F24H 1/121 392/465 |
| 2011/0108545 | A1 * | 5/2011 | Wang | H05B 3/283 219/546 |
| 2011/0217451 | A1 | 9/2011 | Veerasamy | |
| 2013/0222510 | A1 * | 8/2013 | Kim | B41J 2/435 347/224 |

FOREIGN PATENT DOCUMENTS

| | | |
|---|---|---|
| JP | 11-141901 A | 5/1999 |
| JP | 2008044911 A | 2/2008 |
| JP | 2009-525580 A | 7/2009 |
| JP | 2009-543288 A | 12/2009 |
| JP | 2012-516536 A | 7/2012 |
| KR | 1020070079862 A | 8/2007 |
| KR | 2020090010252 U | 10/2009 |
| KR | 1020100090621 A | 8/2010 |
| KR | 101166542 B1 | 7/2012 |
| KR | 1020120124103 A | 11/2012 |
| WO | 2010095844 A2 | 8/2010 |

OTHER PUBLICATIONS

Japanese Office Action dated Jul. 5, 2016 in connection with the counterpart Japanese Patent Application No. 2015-557954.
Japanese Office Action dated Feb. 28, 2017 in connection with the counterpart Japanese Patent Application No. 2015-557954.
International Search Report for PCT/KR2014/001459 dated May 23, 2014.

* cited by examiner

Fig.6
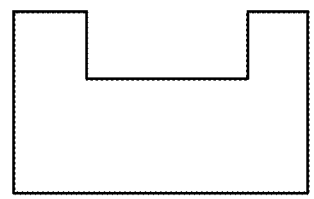
(a)
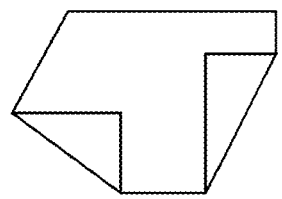
(b)
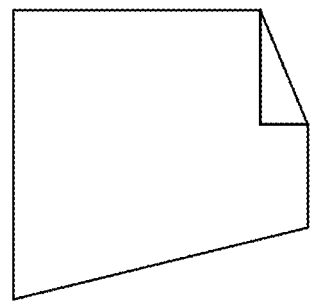
(c)
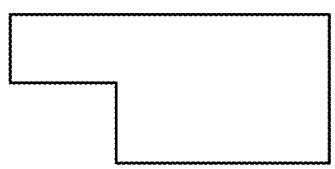
(d)
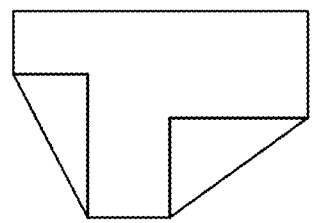
(e)
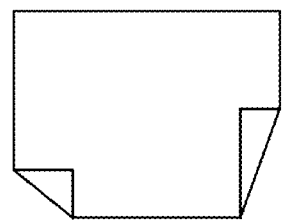
(f)

AUTOMOTIVE SHEET HEATER USING RADIANT HEAT

CROSS REFERENCE TO RELATED APPLICATION

This application claims the priority of Korean Patent Application No. 10-2013-0019048, filed on Feb. 22, 2013 in the KIPO (Korean Intellectual Property Office). Further, this application is the National Phase application of International Application No. PCT/KR2014/001459 filed Feb. 24, 2014, which designates the United States and was published in Korean.

TECHNICAL FIELD

The present invention relates to an automotive sheet heater using radiant heat.

BACKGROUND ART

With the accelerated development of electric vehicles, interest in heating systems, which have not been an issue in typical automobiles, is rapidly increasing. Although typical automobiles have used an air blowing heater, an electric vehicle does not have a separate heating means and batteries of the electric vehicle suffer from efficiency reduction when external temperature falls down to about −10° C. in winter.

To overcome such a drawback, although a sheet heater based on energy transfer is applied to a battery in order to secure temperature uniformity, the sheet heater does not provide sufficient effects in warming the inside of automobiles in winter due to a limit of power consumption. Moreover, since the generally acceptable criteria of air temperature, at which passengers in an automobile feel comfortable, need to be determined and a method for efficiently achieving this temperature is required, there is a need for development of a heater for electric vehicles.

DISCLOSURE

Technical Problem

It is one aspect of the present invention to provide an automotive sheet heater, which emits radiant heat and transfers the radiant heat to an object by transferring the heat generated due to heat emission of a carbon nanotube heating layer to a metal layer and allowing the heat to pass through a far-infrared radiating layer.

Technical Solution

In accordance with one aspect of the present invention, an automotive sheet heater includes a stacked structure of a far-infrared radiating layer, a metal layer, and a metal wire-containing carbon nanotube heating layer.

The automotive sheet heater may further include an electrode layer, which is electrically connected to the carbon nanotube heating layer and induces heat emission of the carbon nanotube heating layer when power is applied thereto.

The carbon nanotube heating layer may have a heating temperature from about 100° C. to about 300° C. when power is applied to the electrode layer.

The carbon nanotube heating layer may include about 1% by weight (wt %) to about 50 wt % of metal wires.

The far-infrared radiating layer may include a far-infrared radiating material.

The far-infrared radiating material may include at least one selected from the group consisting of fertile soil, red clay, silica, elvan, natural jade, charcoal, germanium, tourmaline, and combinations thereof.

The far-infrared radiating layer may emit radiant heat due to heat emission of the carbon nanotube heating layer.

The metal layer may include a metal sheet having a high thermal conductivity of 200 W/m·K or more so as to emit heat generated from the carbon nanotube heating layer.

The metal layer may include at least one metal sheet selected from the group consisting of aluminum, copper, gold, silver, platinum, and combinations thereof.

The automotive sheet heater may further include a primer layer on a lower side of the far-infrared radiating layer.

The primer layer may include a resin selected from the group consisting of acrylic, epoxy, ester, olefin resins, and combinations thereof.

The automotive sheet heater may further include an interlayer on a lower side of the metal layer.

The interlayer may include glass powder or glass fibers as a binder.

The automotive sheet heater may have a heating temperature from about 50° C. to about 100° C.

The automotive sheet heater may have a thermal efficiency of about 30% or more.

The automotive sheet heater may allow a temperature change of ambient air to be within 10° C.

The automotive sheet heater may be attached to an inside of an automobile so as not to directly contact an object heated by the heater.

Advantageous Effects

The automotive sheet heater can increase an indoor temperature of an electric vehicle, which is not provided with a separate heating system, in winter.

In addition, an automotive indoor temperature at which passengers feel comfortable can be maintained based on a location to which the automotive sheet heater is applied.

DESCRIPTION OF DRAWINGS

FIG. 6 shows various shapes of the automotive sheet heater.

BEST MODE

Hereinafter, embodiments of the present invention will be described in detail with reference to the accompanying drawings. However, it should be understood that the following embodiments are provided for illustration only and are not to be in any way construed as limiting the present invention. The scope of the present invention should be defined only by the accompanying claims and equivalents thereof.

According to one embodiment of the present invention, an automotive sheet heater includes a stacked structure of a far-infrared radiating layer, a metal layer, and a metal wire-containing carbon nanotube heating layer.

The automotive sheet heater serves to maintain an air temperature at which a passenger feels comfortable, and allows the automotive indoor temperature to be maintained by constitution of the automotive sheet heater based on heating temperature of the automotive sheet heater. The comfortable temperature is determined by whether the human body feels comfortable at a certain air temperature. Although different people may feel comfortable at different temperatures, the comfortable temperature refers to an air temperature at which most people feel comfortable.

In contrast to heat generating steering wheels, heat generating seats, or air blowing heaters (for example, air blowing PTC heaters) used in typical vehicles to warm the human lower body and requiring high power consumption, the automotive sheet heater enables effective reduction in energy consumption. In addition, since heating temperature is adjusted by increasing heat flux of the automotive sheet heater as much as possible, the human lower body can be effectively warmed and energy consumption by the heater can be minimized to increase a traveling range.

Specifically, since an electric vehicle does not include a separate heater, when a heater is provided to the human lower body inside the vehicle, a passenger in the vehicle can feel more comfortable than in a vehicle lacking the heater.

Figure 1:
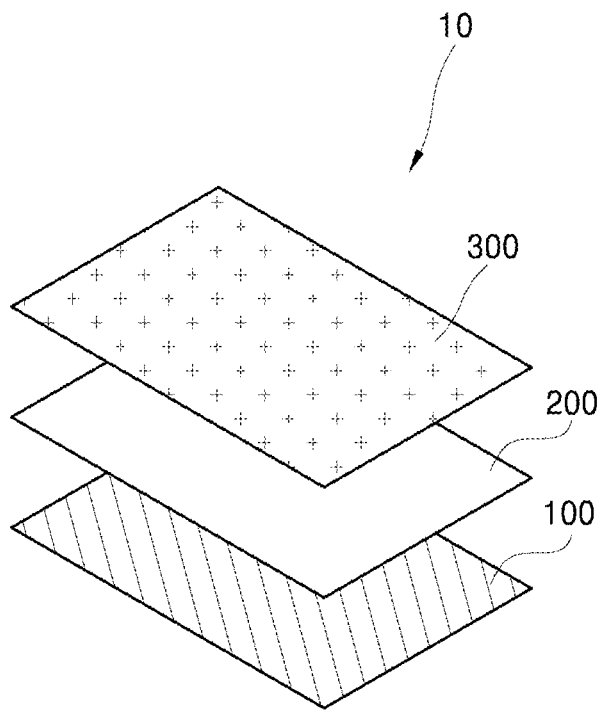
FIG. 1 is a schematic diagram of an automotive sheet heater according to one embodiment of the present invention.

FIG. 1 is a schematic diagram of an automotive sheet heater according to one embodiment of the present invention. An automotive sheet heater 10 may include a far-infrared radiating layer 300, a metal layer 200, and a carbon nanotube heating layer 100.

The carbon nanotube heating layer 100 may include metal wires. Although a composite of metals and carbon nanotubes is typically used in the art, since carbon nanotubes are subjected to surface treatment with spherical metal particles, the metal particles are unevenly dispersed as in the case of coating onto a curved surface and electricity can flow to one side due to disconnection of the metal particles. To solve this problem, the carbon nanotube heating layer includes fine line-shaped metal wires instead of the spherical metal particles. In this case, the metal wires can be uniformly dispersed on the carbon nanotubes, thereby enabling uniform current flow when voltage is applied to the carbon nanotube heating layer.

The metal wires refer to a wire structure having a certain diameter and may include nanowires having a diameter of less than about 10 nm to hundreds of nanometers. Specifically, the metal wires may have a diameter from about 20 nm to about 250 nm.

In addition, the metal wires may have an aspect ratio from about 4 to about 50. The aspect ratio refers to a ratio of length to width, and means a value obtained by dividing a length of the metal wires by a diameter thereof. Specifically, the metal wires may have a length from about 1 μm to about 10 μm.

Figure 2:
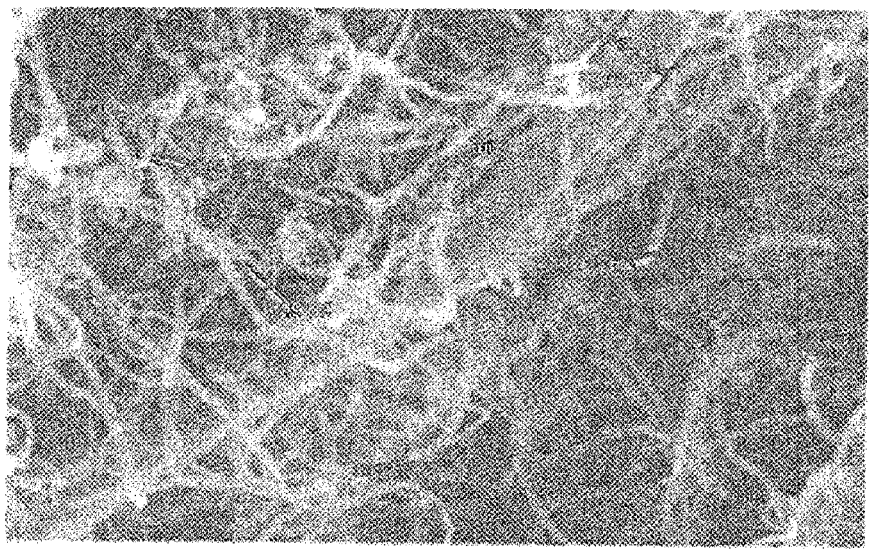
FIG. 2 is an SEM image of a carbon nanotube heating layer included in the automotive sheet heater.

FIG. 2 is an SEM image of a carbon nanotube heating layer included in the automotive sheet heater, and it can be seen that the carbon nanotube heating layer includes metal wires having a diameter from about 20 nm to about 250 nm.

The automotive sheet heater may further include an electrode layer, which is electrically connected to the carbon nanotube heating layer and induces heat emission of the carbon nanotube heating layer when power is applied to the electrode layer. When power is applied to the electrode layer, that is, voltage is applied and current flows thereto, heat is generated from the carbon nanotube heating layer and the temperature of the carbon nanotube heating layer can be increased. Specifically, heat generated by the carbon nanotube heating layer is conducted to the far-infrared radiating layer and can pass through the far-infrared radiating layer to emit radiant heat, which in turn can be transferred to an object heated by the heater.

More specifically, when power is applied to the electrode layer, the carbon nanotube heating layer may reach a heating temperature from about 100° C. to about 300° C. The heating temperature refers to a surface temperature of the carbon nanotube heating layer when power is applied to the electrode layer. Since heat is generated from the carbon nanotube heating layer by applying power to the electrode layer, the carbon nanotube heating layer can maintain a certain heating temperature due to the generated heat.

Since the carbon nanotube heating layer includes the metal wires, when power is applied to the electrode layer, electricity can uniformly flow and the heating temperature can be maintained within the above range. Since the heating temperature of the carbon nanotube heating layer is maintained, loss of heat conducted to the far-infrared radiating layer and the metal layer can be prevented, thereby maintaining the comfortable temperature.

The carbon nanotube heating layer may have a thickness from about 2 μm to about 10 μm. Since the thickness of the carbon nanotube heating layer is uniformly maintained within this range, cracking can be prevented and the automotive sheet heater can secure a certain level of durability.

The carbon nanotube heating layer may include about 1 wt % to about 50 wt % of the metal wires. Details of the metal wires are as described above. Since the metal wires are present in an amount within this range, it is easy to control the temperature of the carbon nanotube heating layer, efficiency in realizing target surface resistance of the sheet heater is excellent, and electricity flow can be facilitated. Specifically, the metal wires may include at least one selected from the group consisting of silver, copper, aluminum, gold, platinum, and combinations thereof. Preferably, the metal wires are silver wires in consideration of electrical conductivity.

The far-infrared radiating layer 300 may include a far-infrared radiating material. Since the automotive sheet heater includes the far-infrared radiating layer, human body-friendly heat can be generated and energy savings can be achieved by spectral emissivity of the far-infrared radiating layer. Specifically, the far-infrared radiating material may include at least one selected from the group consisting of fertile soil, red clay, silica, elvan, natural jade, charcoal, germanium, tourmaline, and combinations thereof.

Far infrared refers to infrared providing stronger heat than visible light in a wavelength range from about 3 μm to about 1000 μm. Heat generated by the carbon nanotube heating layer passes through the far-infrared radiating layer, thereby generating far-infrared light emission. In addition, the far-infrared radiating layer absorbs the generated far-infrared light, thereby emitting radiant heat. The radiant heat refers to heat generated when electromagnetic waves emitted from an object heated by the heater are converted into heat when absorbed directly by the object. The far-infrared light emitted from the far-infrared radiating layer is converted into heat upon absorption by the far-infrared radiating layer, thereby generating radiant heat.

The automotive sheet heater may include the metal layer 200 between the far-infrared radiating layer 300 and the carbon nanotube heating layer 100. Since the metal layer includes a heat radiating metal sheet having high thermal conductivity, the metal layer allows heat generated from the carbon nanotube heating layer to be rapidly transferred to the far-infrared radiating layer while minimizing heat loss, thereby maintaining thermal efficiency of the automotive sheet heater at 30% or more. In addition, the metal layer serves as a heat sink discharging heat generated from the carbon nanotube heating layer and is thus prevented from thermal deformation, thereby preventing thermal deformation of the overall automotive sheet heater.

Specifically, the metal layer may include a heat radiating metal sheet having high thermal conductivity of 200 W/m·K or more such that heat generated from the carbon nanotube heating layer can be discharged. More specifically, the metal layer may include at least one metal sheet selected from the group consisting of aluminum, copper, gold, silver, platinum sheets, and combinations thereof. The metal layer may be an aluminum metal sheet in consideration of thermal conductivity and price competitiveness. Since the aluminum metal sheet has high thermal diffusivity and thus exhibits excellent thermal conductivity particularly in a thickness direction thereof, the aluminum metal sheet enables heat to be easily discharged without heat accumulation.

The metal layer may have a thickness from about 0.1 mm to about 2 mm. If the thickness of the metal layer is too small, the metal layer does not discharge heat generated from the carbon nanotube heating layer, and if the thickness of the metal layer is too high, it is difficult to prepare the automotive sheet heater in a curved sheet shape.

Figure 3:
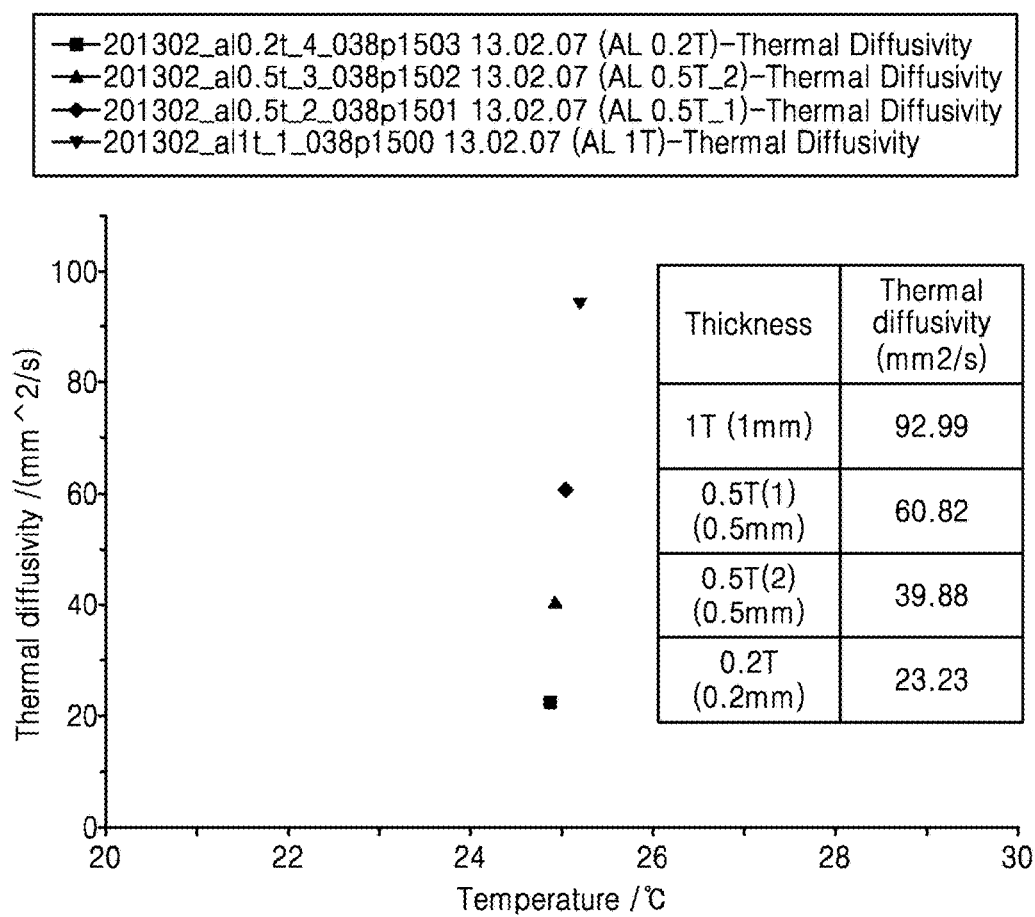
FIG. 3 shows measurement results of thermal diffusivity of an aluminum metal sheet, which is used as a metal layer in the automotive sheet heater.

FIG. 3 shows measurement results of thermal diffusivity of an aluminum metal sheet used as a metal layer in the automotive sheet heater. Referring to FIG. 3, since the 1 mm thick, 0.5 mm thick, 0.5 mm thick and 0.2 mm thick aluminum metal sheets had thermal diffusivities (in the thickness direction) of 92.99 $mm^2/s$, 60.82 $mm^2/s$, 39.88 $mm^2/s$, and 23.23 $mm^2/s$ as measured at about 25° C., respectively, and all of the thermal diffusivities were high, it could be confirmed that all the aluminum metal sheets had high thermal conductivities proportional to the thermal diffusivities.

Figure 4:
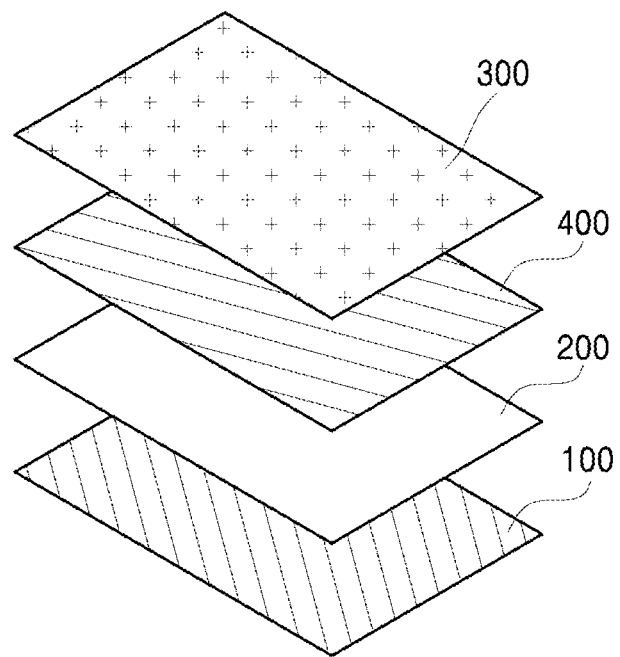
FIG. 4 is a schematic diagram of an automotive sheet heater according to another embodiment of the present invention.

FIG. 4 is a schematic diagram of an automotive sheet heater according to another embodiment of the present invention. Referring to FIG. 4, an automotive sheet heater 10 may include, from top to bottom, a far-infrared radiating layer 300, a primer layer 400, a metal layer 200, and a carbon nanotube heating layer 100.

Since the primer layer 400 exhibits adhesion and is provided to resolve insufficient adhesion between the far-infrared radiating layer 300 and the metal layer 200, the primer layer 400 may be disposed between the far-infrared radiating layer 300 and the metal layer 200.

Since the primer layer may have a thickness from about 2 μm to about 20 μm and the thickness of the primer layer is maintained within this range, cracking can be minimized and the far-infrared radiating layer can be uniformly coated.

The primer layer may include a resin selected from the group consisting of acrylic, epoxy, ester, olefin resins, and combinations thereof.

Examples of the urethane resin may include polyurethane dispersion resins, isoprene diisocyanates such as polyethylene-modified polyurethane resins, polyurethane resins prepared from adipic acid and polyhydric alcohols, polyurethane resins prepared from acrylic polyols and polyisocyanates such as acrylic-urethane resins, polyethylene-acrylic-modified polyurethane resins and the like, polyurethane resins prepared from polycaprolactone polyols or polycarbonate polyols, isocyanates and para-phenylene diisocyanate, polyurethane resins prepared from 4,4'-bis(ω-hydroxyalkyleneoxy)biphenyl and methyl-2,6-diisocyanate hexanoate, acetal bond-containing polyurethane resins, and the like.

Specifically, the polyhydric alcohols may include acrylic polyols, polyester polyols, polyether polyols, polyolefin polyols, and the like.

Since the acrylic resin exhibits excellent temperature and humidity resistance, cold resistance and processability, and is low-priced, the acrylic resin is used on an upper side of the metal layer, thereby improving adhesion between the metal layer and the far-infrared radiating layer. The acrylic resin may be an acrylic resin prepared from a typical monomer composition including a water-soluble carboxyl group.

Examples of the acrylic resin monomer may include methyl(meth)acrylate, ethyl(meth)acrylate, isopropyl(meth)acrylate, n-butyl(meth)acrylate, isobutyl(meth)acrylate, 2-ethylhexyl(meth)acrylate, hydroxypropyl(meth)acrylate, stearyl(meth)acrylate, and hydroxybutyl(meth) acrylate.

Since the epoxy resin also exhibits excellent properties in terms of adhesion, corrosion resistance, top coat paintability, and the like, the epoxy resin can be appropriately used on the upper side of the metal layer. The epoxy resin may include bisphenol A type resins, bisphenol F type resins, novolac resins, and the like.

The ester resin exhibits excellent properties in terms of curability, chemical resistance, heat resistance, plasticity and adhesion to organic materials, and thus can be used on the upper side of the metal layer. The ester resin may include polyester resins prepared from maleic anhydride, isophthalic acid, terephthalic acid, tetrahydrophthalic anhydride, methyl tetrahydrophthalic anhydride, adipic acid and pimelic acid), ethylene glycol-modified ester resins, propylene glycol-modified ester resins, and neopentyl glycol-modified ester resins.

Figure 5:
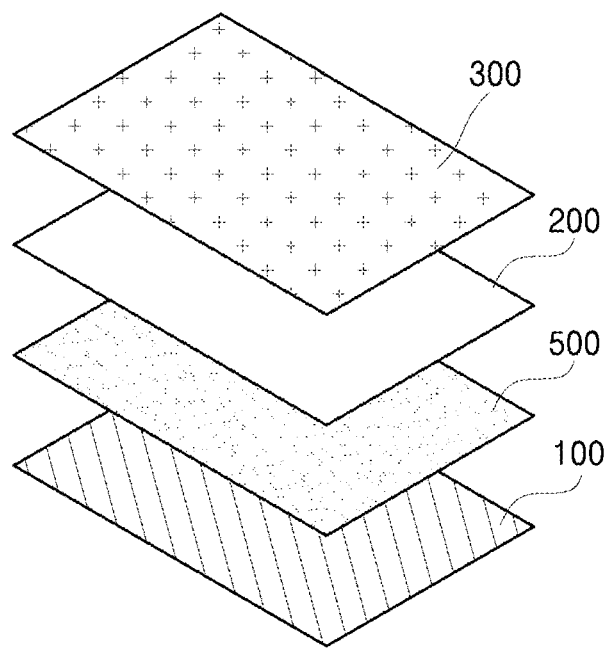
FIG. 5 is a schematic diagram of an automotive sheet heater according to a further embodiment of the present invention.

FIG. 5 is a schematic diagram of an automotive sheet heater according to a further embodiment of the present invention. Referring to FIG. 5, an automotive sheet heater 10 may include, from top to bottom, a far-infrared radiating layer 300, a metal layer 200, an interlayer 500, and a carbon nanotube heating layer 100.

The interlayer 500 is an electrically insulating layer and electricity does not flow therethrough. Thus, when heat generated by the carbon nanotube heating layer 100 is transferred to the far-infrared radiating layer 300 through the metal layer 200, the interlayer 500 serves to prevent the far-infrared radiating layer from wrinkling, since the far-infrared radiating layer is not uniformly attached to an upper side of the metal layer and bubbles are generated between the metal layer and the far-infrared radiating layer.

The interlayer may include glass powder or glass fibers as a binder. Since the interlayer includes glass powder or glass fibers as a binder, the interlayer becomes an electrically insulating layer so as not to allow electricity to flow therethrough and thus can prevent non-uniform formation of the far-infrared radiating layer on the upper side of the metal layer due to heat.

The glass powder refers to glass present in powder form. The glass powder may have a particle diameter from about 0.4 µm to about 40 µm. In addition, the glass fibers refer to fibers obtained by preparing molten glass into a fiber form. Since the glass fibers exhibit excellent properties such as tensile strength with decreasing diameter thereof, the glass fibers included in the interlayer may have a diameter from about 5 µm to about 20 µm.

The interlayer may be formed by mixing the glass powder and the glass fibers as a binder with various additives and synthetic resin materials.

The automotive sheet heater may have a heating temperature from about 50° C. to about 100° C. The heating temperature refers to a surface temperature of the heater generating radiant heat. Although the heating temperature of the carbon nanotube heating layer may range from about 100° C. to about 300° C. when power is applied to the electrode layer, the automotive sheet heater can secure a heating temperature from about 50° C. to about 100° C. due to heat loss by the far-infrared radiating layer and the metal layer.

The automotive sheet heater may have a thermal efficiency (e) of about 30% or more. The thermal efficiency (e) can be calculated by Equation represented by $\{1-(Qrad)/(Qref)\}\times 100$. Here, Qref is heat flux of an initial-state heater free from radiant heat; Qrad is heat flux of the later-state heater having radiant heat; each of Qref and Qrad is obtained using ANSYS (simulation model); and thermal efficiency can be calculated by measuring the surface temperature of the heater upon heating and the temperature of an object heated by the heater, followed by substitution using obtained Qref and Qrad.

The heat flux refers to the rate of heat energy transfer through a given surface per unit surface. The heat flux of the automotive sheet heater refers to quantity of radiant heat passing through a unit area per unit time, in which the radiant heat is generated due to the carbon nanotube heating layer, the metal layer and the far-infrared radiating layer. In addition, the heat flux of the automotive sheet heater can be calculated through Equation and a 3D simulation model:

$$Q=h_c\cdot(RST-t_a)+\epsilon_s\cdot\epsilon_a\cdot\sigma\cdot[(RST+273.2)^4-(t_r+273.2)^4] \quad \text{[Equation]}$$

wherein Q is heat flux; $h_c$ is the coefficient of convective heat transfer; RST is the surface temperature; $t_a$ is the air temperature; $\epsilon_s$ and $\epsilon_a$ are the coefficients of emission; $\sigma$ is the Boltzmann constant; and $t_r$ is the mean radiant temperature.

Here, the surface temperature (RST) is a factor determined by thermal equilibrium in which heat loss is reflected, and the heat flux can be measured in consideration of an air temperature inside an automobile, a radiant temperature from the heater, and the like.

The heat flux can provide a direct effect on thermal efficiency of the automotive sheet heater and an ambient air temperature. Since the automotive sheet heater maintains a certain range of heat flux, a constant air temperature can be maintained, and the object heated by the heater can feel comfortable inside the automobile in winter.

For example, with the automotive sheet heaters placed at left, right and upper sides with respect to the lower body of a passenger in the automobile, heat fluxes moving through a unit area per unit time for radiant heat of the sheet heater were compared to calculate thermal efficiency, as described above. As a result, when the automotive sheet heater had a thermal efficiency of about 30% or more, since the temperature change in ambient air of the automotive sheet heater was maintained within about 10° C., it could be seen that the automotive sheet heater was efficient.

In addition, when the thermal efficiency was about 50% or more, since temperature change in ambient air of the automotive sheet heater was maintained within about 5° C., the comfortable temperature could be maintained inside the automobile. Further, when the thermal efficiency was about 60% or more, it was confirmed that the ambient air temperature of the automotive sheet heater was not lowered to room temperature or less.

Therefore, when the automotive sheet heater has a thermal efficiency of about 30% or more, there is a merit in that body temperature of the passenger can be maintained at room temperature, and that the air temperature can be maintained at the comfortable temperature.

The automotive sheet heater may allow the temperature change in ambient air to be within 10° C. The temperature change in ambient air refers to change in ambient air temperature between before and after operation of the automotive sheet heater. As the sheet heater has better thermal efficiency, the change in ambient air temperature is decreased and the interior of the automobile can be maintained at a suitable temperature.

For example, the object heated by the automotive sheet heater may be the human body, that is, a passenger in the automobile. Since the object heated by the heater is aware of the temperature change in ambient air of the automotive sheet heater, when the temperature change in ambient air is about 10° C. or less, the human body feels comfortable and can feel comfortable in terms of heat when the body temperature is maintained in legs, hands and chest.

The automotive sheet heater may be attached to the inside of the automobile so as not to directly contact the object heated by the heater. Since the automotive sheet heater emits radiant heat due to the far-infrared radiating layer, even though the automotive sheet heater does not directly contact the object heated by the heater, the object can feel warm through ambient air heated due to emission of the radiant heat. When the object heated by the heater is the human body, for example, a passenger in the automobile, the ambient air temperature of the automotive sheet heater can be maintained due to emission of radiant heat from the automotive sheet heater without direct contact between the object and the automotive sheet heater.

Specifically, the automotive sheet heater may be placed towards the human lower body instead of the human upper body. By operating the automotive sheet heater capable of adjusting heat flux in five stages, a comfortable temperature at which the human body feels comfortable was calculated for each portion of the body based on amounts of radiant heat emitted in each stage. As a result, it could be seen that legs had the greatest effect on the comfortable temperature which the human body felt. As such, since it was confirmed that the human lower body was most important in maintaining the body temperature, the automotive sheet heater was placed towards the human lower body to maintain the air temperature at which the human body felt comfortable, thereby allowing radiant heat from the automotive sheet heater to affect the human lower body.

FIG. 6 shows various shapes of the automotive sheet heater. To heat the human lower body, the automotive sheet heaters having various shapes may be disposed mainly under a seat of the automobile and be placed in various polygonal shapes inside the automobile.

Next, the present invention will be described in more detail with reference to some examples. It should be understood that these examples are provided for illustration only and are not to be in any way construed as limiting the present invention.

EXAMPLE AND COMPARATIVE EXAMPLE

Example

Using silkscreen printing and bar coating, a far-infrared radiating layer, a metal layer and a metal wire-containing carbon nanotube heating layer were printed and coated, followed by lamination of the prepared layers, thereby preparing an automotive sheet heater.

Comparative Example

An automotive sheet heater was prepared in the same manner as in Example except that the carbon nanotube heating layer was not included.

<Experimental Example 1>—Experiment for Confirming Far-Infrared Effect of Automotive Sheet Heater With the automotive sheet heaters of Example and Comparative Example placed in a closed system box and the far-infrared radiating layer set as an original point (0 cm), temperature change was observed at distances of 10 cm, 20 cm and 30 cm from the far-infrared radiating layer. Here, powers of 88 W and 120 W were applied to the closed system box to measure temperature change with respect to power.

Table 1 shows temperature change at distances from the far-infrared radiating layer when a power of 88 W was applied to the automotive sheet heater of Example; Table 2 shows temperature change at distances from the far-infrared radiating layer when a power of 88 W was applied to the automotive sheet heater of Comparative Example; Table 3 shows temperature change at distances from the far-infrared radiating layer when a power of 120 W was applied to the automotive sheet heater of Example; and Table 4 shows temperature change at distances from the far-infrared radiating layer when a power of 120 W was applied to the automotive sheet heater of Comparative Example.

TABLE 1

|  | 0 cm Surface temperature (° C.) | 10 cm Surface temperature (° C.) | 20 cm Surface temperature (° C.) | 30 cm Surface temperature (° C.) |
| --- | --- | --- | --- | --- |
| Start (0 min) | 24 | 24 | 23.7 | 23.8 |
| 10 min | 78.3 | 31.7 | 30.2 | 27.3 |
| 20 min | 80.9 | 34.5 | 32.9 | 30.1 |
| 30 min | 82.1 | 36.6 | 34.9 | 32.4 |

TABLE 2

|  | 0 cm Surface temperature (° C.) | 10 cm Surface temperature (° C.) | 20 cm Surface temperature (° C.) | 30 cm Surface temperature (° C.) |
| --- | --- | --- | --- | --- |
| Start (0 min) | 23.8 | 23.1 | 23.7 | 23.0 |
| 10 min | 78.3 | 28.1 | 26.9 | 25.1 |
| 20 min | 80.0 | 29.0 | 27.8 | 26.3 |
| 30 min | 80.5 | 29.8 | 28.6 | 27.2 |

TABLE 3

|  | 0 cm Surface temperature (° C.) | 10 cm Surface temperature (° C.) | 20 cm Surface temperature (° C.) | 30 cm Surface temperature (° C.) |
| --- | --- | --- | --- | --- |
| Start (0 min) | 24.1 | 24.2 | 24.1 | 24.5 |
| 10 min | 98.6 | 36.2 | 34.9 | 30.1 |
| 20 min | 100.6 | 39.7 | 37.8 | 34.2 |
| 30 min | 101.4 | 42.1 | 40.3 | 37.0 |

TABLE 4

|  | 0 cm Surface temperature (° C.) | 10 cm Surface temperature (° C.) | 20 cm Surface temperature (° C.) | 30 cm Surface temperature (° C.) |
| --- | --- | --- | --- | --- |
| Start (0 min) | 24.5 | 24.1 | 24.2 | 23.7 |
| 10 min | 99.8 | 30.5 | 28.9 | 27.0 |
| 20 min | 100.0 | 31.6 | 30.1 | 28.5 |
| 30 min | 100.0 | 32.5 | 31.0 | 29.6 |

Referring to Tables 1 to 4, when a power of 88 W was applied to the automotive sheet heater of Example including the carbon nanotube heating layer, the temperature was increased by about 8.6° C., and when a power of 120 W was applied thereto, the temperature was increased by about 12.5° C. The temperature increments were about twice those of the automotive sheet heater of Comparative Example that did not include the carbon nanotube heating layer when powers of 88 W and 120 W were applied thereto. Therefore, it could be seen that the automotive sheet heater of Example including the carbon nanotube heating layer had superior radiant energy effects to that of Comparative Example.

Figure 7:
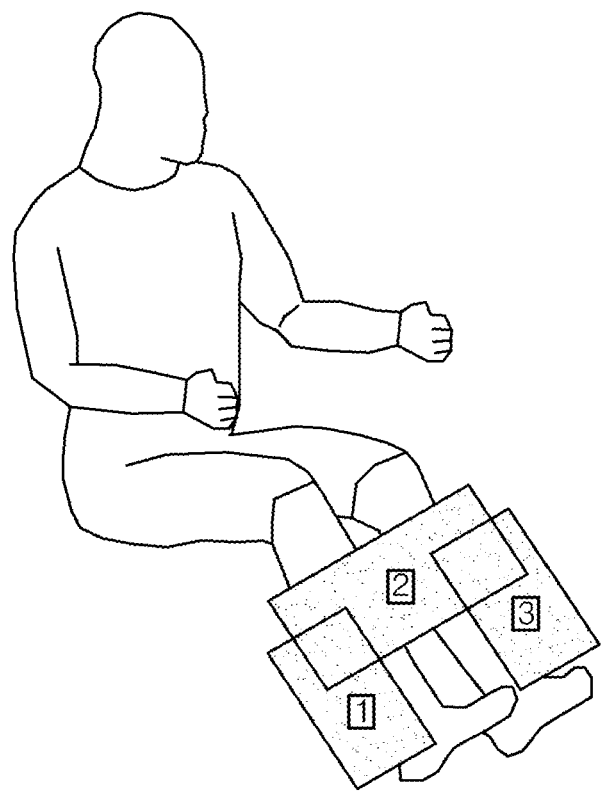
FIG. 7 shows diagrammatic locations of the automotive sheet heater mounted in an automobile in Experimental Example 2.

<Experimental Example 2>—Evaluation of Mounting Location of Automotive Sheet Heater FIG. 7 shows diagrammatic locations of the automotive sheet heater mounted in an automobile in Experimental Example 2. Specifically, a location at a right side of the human lower body is denoted by 1, a location at an upper side of the human lower body is denoted by 2, and a location at a left side of the human lower body is denoted by 3. Then, the automotive sheet heater of Example was placed at each location inside an electric vehicle and certain power was applied to the electric vehicle to operate the automotive sheet heater of Example.

1) Heating Temperature and Thermal Efficiency

The sheet heater was placed at each of locations as listed in Table 5, followed by operating the automotive sheet heater. In accordance with DIN EN ISO 7730, sensors were placed at head and bottom portions of a driver seat, followed by measuring the heating temperature by the automotive sheet heater. Specifically, the heating temperature was measured under driving conditions of second gear and a speed of 32 km/h.

In addition, as described above, heat flux was measured before and after operation of the automotive sheet heater to calculate thermal efficiency. Higher thermal efficiencies of the automotive sheet heater represent better effects thereof.

2) Minimum Temperature of Ambient Air, which Human Body Feels

One hundred people rode in a vehicle provided with the automotive sheet heater, followed by measuring the minimum temperature of the ambient air temperature, which the one hundred people felt, and measuring a change in ambient air temperature between before and after operation of the automotive sheet heater.

TABLE 5

| Location of sheet heater | Heating temperature (° C.) | Thermal efficiency (%) | Minimum temperature of ambient air, which the human body felt | Temperature change in ambient air (° C.) |
| --- | --- | --- | --- | --- |
| 1 | 1, 2, 3 | 50 | 38 | 22.6 | 10 |
| 2 | 1, 2, 3 | 70 | 62 | 26.6 | 8 |
| 3 | 1, 2, 3 | 100 | 64 | 28.3 | 8 |
| 4 | 3 | 75 | 34 | 22.6 | 10 |
| 5 | 1 | 75 | 37 | 22.9 | 10 |
| 6 | 2 | 75 | 38 | 22.3 | 10 |
| 7 | 1, 3 | 75 | 53 | 24.1 | 9 |

Referring to Table 5, although there were some differences depending on locations of the automotive sheet heater and whether the automotive sheet heater was operated, the automotive sheet heater of Example had a heating temperature from about 50° C. to about 100° C. and a thermal efficiency from about 30% to about 60%. In addition, it was confirmed that the passengers felt comfortable since the temperature change in ambient air of the automotive sheet heater of Example was maintained within about 10° C., and that the passengers felt comfortable in terms of heat, since body temperature was maintained in legs, hands and chest.

<Experimental Example 3>—Comparison of Power Consumption of Automotive Sheet Heater When an air blowing PTC heater (VW POLO BEHR 6R0.988.235) was placed in an electric vehicle and automotive sheet heaters 1, 2, 3 of Example were placed therein as described with reference to FIG. 6, power consumption necessary to increase the inner temperature the electric vehicle to the same temperature was measured in each case. Results are shown in FIG. 7.

Figure 8:
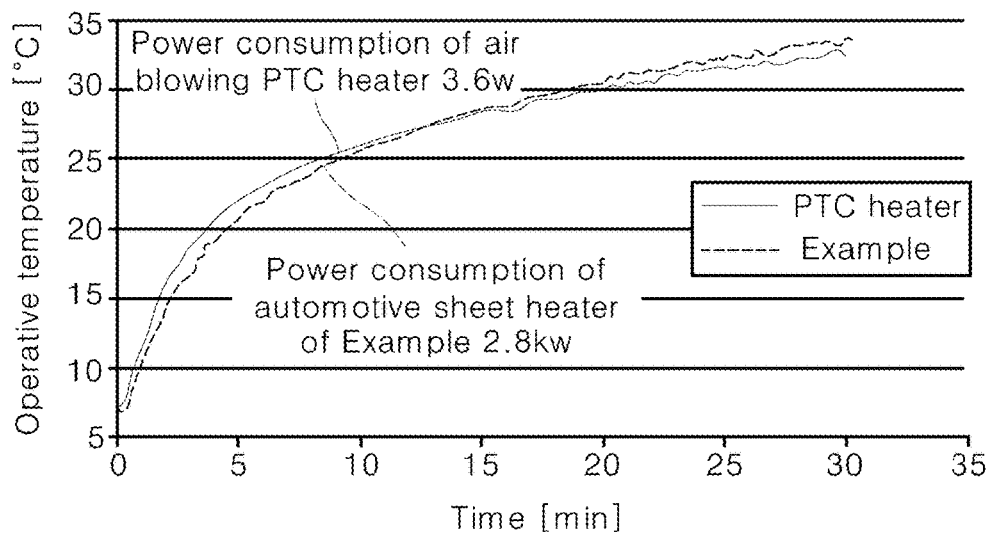
FIGS. 8 and 9 are graphs depicting power consumption when the automotive sheet heater of Example and an air blowing PTC heater are mounted in Experimental Example 3, respectively.

Referring to FIG. 8, both the air blowing PTC heater and the automotive sheet heater required a similar time from about 15 minutes to about 20 minutes to increase the inner temperature of the vehicle to about 30° C. However, the air blowing PTC heater had a power consumption of 3.6 W and the automotive sheet heater of Example had a power consumption of 2.8 W. Therefore, it could be confirmed that the automotive sheet heater of Example had lower power consumption, and thus, it could be seen that the automotive sheet heater of Example was more suitable for securing the inner temperature of the vehicle.

In addition, when each of the air blowing PTC heater and the automotive sheet heater was placed inside the electric vehicle, for precise measurement, generated radiant heat was measured using a D-type sensor, which is capable of rapidly responding to temperature change and is provided with a silver foil having the highest saturation temperature. Results are shown in FIG. 8.

Figure 9:
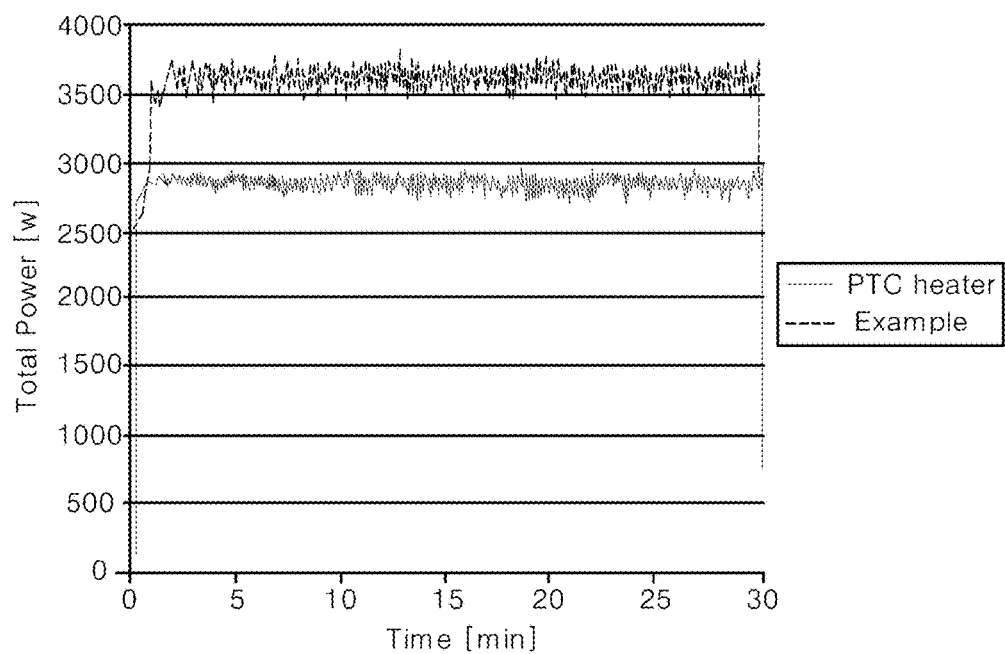

Referring to FIG. 9, when the electric vehicle was operated for about 30 minutes, it was confirmed that the automotive sheet heater of Example reduced power consumption up to by 0.8 kW and reduced the power consumption of the electric vehicle by about 21%, as compared with the air blowing PTC heater. Therefore, it could be seen that the automotive sheet heater of Example exhibited more outstanding energy efficiency than the typical air blowing PTC heater.

The invention claimed is:

1. An automotive sheet heater comprising:
   a stacked structure of:
     a far-infrared radiating layer,
     a metal layer, and
     a metal wire-containing carbon nanotube heating layer,
       wherein the carbon nanotube heating layer comprises 1 wt % to 50 wt % metal wires.

2. The automotive sheet heater according to claim 1, further comprising: an electrode layer, which is electrically connected to the carbon nanotube heating layer and induces heat emission of the carbon nanotube heating layer when power is applied thereto.

3. The sheet heater according to claim 2, wherein the carbon nanotube heating layer has a heating temperature from 100° C. to 300° C. when power is applied to the electrode layer.

4. The sheet heater according to claim 1, wherein the far-infrared radiating layer comprises a far-infrared radiating material.

5. The sheet heater according to claim 4, wherein the far-infrared radiating material comprises at least one selected from the group consisting of fertile soil, red clay, silica, elvan, natural jade, charcoal, germanium, tourmaline, and combinations thereof.

6. The sheet heater according to claim 1, wherein the far-infrared radiating layer emits radiant heat due to heat emission of the carbon nanotube heating layer.

7. The sheet heater according to claim 1, wherein the metal layer comprises a metal sheet having a high thermal conductivity of 200 W/m·K or more so as to emit heat generated from the carbon nanotube heating layer.

8. The sheet heater according to claim 1, wherein the metal layer comprises at least one metal sheet selected from the group consisting of aluminum, copper, gold, silver, platinum, and combinations thereof.

9. The sheet heater according to claim 1, further comprising: a primer layer on a lower side of the far-infrared radiating layer.

10. The sheet heater according to claim 9, wherein the primer layer comprises a resin selected from the group consisting of acrylic, epoxy, ester resins, and combinations thereof.

11. The sheet heater according to claim 1, further comprising: an interlayer on a lower side of the metal layer.

12. The sheet heater according to claim 11, wherein the interlayer comprises glass powder or glass fibers as a binder.

13. The sheet heater according to claim 1, wherein the automotive sheet heater has a heating temperature from 50° C. to 100° C.

14. The sheet heater according to claim 1, wherein the automotive sheet heater has a thermal efficiency of 30% or more.

* * * * *